| (12) | United States Patent | (10) Patent No.: | US 9,310,544 B2 |
|---|---|---|---|
| | Choi et al. | (45) Date of Patent: | Apr. 12, 2016 |

(54) POLARIZER AND DISPLAY DEVICE INCLUDING THE SAME

(71) Applicant: Samsung Display Co., Ltd., Yongin (KR)

(72) Inventors: Suk Choi, Seongnam-si (KR); Jihong Bae, Yongin-si (KR); Valeriy Prushinskiy, Hwaseong-si (KR); Hyun-Joo Hwang, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/522,380

(22) Filed: Oct. 23, 2014

(65) Prior Publication Data

US 2015/0226893 A1    Aug. 13, 2015

(30) Foreign Application Priority Data

Feb. 7, 2014  (KR) .......................... 10-2014-0014263

(51) Int. Cl.
*G02B 5/30* (2006.01)
*G06F 3/00* (2006.01)
*G02F 1/13* (2006.01)
*G06F 3/041* (2006.01)
*G02F 1/133* (2006.01)

(52) U.S. Cl.
CPC ............ *G02B 5/3016* (2013.01); *G02B 5/3033* (2013.01); *G02F 1/133* (2013.01); *G06F 3/0412* (2013.01)

(58) Field of Classification Search
CPC ........................... G02B 5/3016; G06F 3/0412
See application file for complete search history.

(56) References Cited

U.S. PATENT DOCUMENTS

| 6,767,937 | B2 | 7/2004 | Schunk et al. |
| 7,522,240 | B1 * | 4/2009 | Jang .................... G02F 1/13363 349/102 |
| 7,763,330 | B2 | 7/2010 | Lub et al. |
| 7,830,482 | B2 * | 11/2010 | Lin ................... G02F 1/133753 349/114 |
| 7,875,323 | B2 * | 1/2011 | Rho .................. G02F 1/133711 427/166 |
| 7,978,302 | B2 | 7/2011 | Peeters et al. |
| 8,236,208 | B2 | 8/2012 | Takeda et al. |
| 8,246,880 | B2 | 8/2012 | Kawabe et al. |

(Continued)

FOREIGN PATENT DOCUMENTS

| JP | 2006-323069 | 11/2006 |
| JP | 2007-072163 | 3/2007 |

(Continued)

*Primary Examiner* — Ida M Soward
(74) *Attorney, Agent, or Firm* — H.C. Park & Associates, PLC

(57) ABSTRACT

A polarizer including a base film, a first alignment layer disposed on the base film, a phase delay layer disposed on the first alignment layer, a second alignment layer disposed on the phase delay layer, and a polarizing layer disposed on the second alignment layer. The phase delay layer includes a first liquid crystal composition including first liquid crystals, a first antioxidant, and a derivative thereof.

14 Claims, 8 Drawing Sheets

(56) References Cited

U.S. PATENT DOCUMENTS

| | | | |
|---|---|---|---|
| 8,481,997 B2 * | 7/2013 | Kim | H01L 51/0096 257/40 |
| 9,007,669 B2 * | 4/2015 | Heim | B42D 15/0013 283/86 |
| 2006/0215085 A1 * | 9/2006 | Wang | G02F 1/133555 349/114 |
| 2008/0180605 A1 * | 7/2008 | Kim | G02F 1/1393 349/96 |
| 2008/0252820 A1 * | 10/2008 | Ban | G02F 1/133632 349/75 |
| 2010/0165223 A1 * | 7/2010 | Cho | C09K 19/3001 349/33 |
| 2012/0140161 A1 | 6/2012 | Nimura et al. | |
| 2013/0230642 A1 * | 9/2013 | Do | G02B 5/3083 427/98.4 |
| 2013/0258256 A1 * | 10/2013 | Kim | G02F 1/13363 349/102 |
| 2015/0029454 A1 * | 1/2015 | Xie | G02F 1/133784 349/128 |
| 2015/0103295 A1 * | 4/2015 | Hiratsuka | G02B 5/3016 349/96 |

FOREIGN PATENT DOCUMENTS

| | | |
|---|---|---|
| JP | 2007-223056 | 9/2007 |
| JP | 2009-051992 | 3/2009 |
| JP | 2011-137954 | 7/2011 |
| JP | 2013-037161 | 2/2013 |
| WO | 2008/102466 | 8/2008 |

* cited by examiner

POLARIZER AND DISPLAY DEVICE INCLUDING THE SAME

CROSS-REFERENCE TO RELATED APPLICATION

This application claims priority from and the benefit of Korean Patent Application No. 10-2014-0014263, filed on Feb. 7, 2014, which is hereby incorporated by reference for all purposes as if fully set forth herein.

BACKGROUND

1. Field

Exemplary embodiments of the present invention relate to a polarizer, a display device including the same, and a method of manufacturing the polarizer.

2. Discussion of the Background

Recently, a flexible or foldable display device (hereinafter, referred to as a "flexible display device") has been under development. The flexible display device includes a flexible display panel and various functional and optical films.

The functional and optical films are disposed on at least one surface among one side or the other side of the flexible display panel. The functional and optical films may be flexible or foldable together with the flexible display panel.

The above information disclosed in this Background section is only for enhancement of understanding of the background of the invention, and, therefore, it may contain information that does not constitute prior art.

SUMMARY

Exemplary embodiments of the present invention provide a display device having improved visibility and high reliability.

Exemplary embodiments of the present invention also provide a method of manufacturing a display device having high quality.

Additional features of the invention will be set forth in the description which follows, and in part will be apparent from the description, or may be learned by practice of the invention.

An exemplary embodiment of the present invention discloses a polarizer including a base film, a first alignment layer disposed on the base film, a phase delay layer disposed on the first alignment layer, a second alignment layer disposed on the phase delay layer, and a polarizing layer disposed on the second alignment layer. The phase delay layer may include a first liquid crystal composition including first liquid crystals, a first antioxidant, and a derivative thereof An exemplary embodiment of the present invention also discloses a display device including a display panel and a polarizer provided on the display panel. The polarizer may include a base film, a first alignment layer disposed on the base film, a phase delay layer disposed on the first alignment layer, a second alignment layer disposed on the phase delay layer, and a polarizing layer disposed on the second alignment layer. The phase delay layer may include a first liquid crystal composition including first liquid crystals, a first antioxidant, and a derivative thereof An exemplary embodiment of the present invention also discloses a method of manufacturing a polarizer, including forming a first alignment material on a base film, forming a first alignment layer by optically aligning the first alignment material, forming a phase delay layer on the first alignment layer, forming a second alignment material on the phase delay layer, forming a second alignment layer by optically aligning the second alignment material, and forming a polarizing layer on the second alignment layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
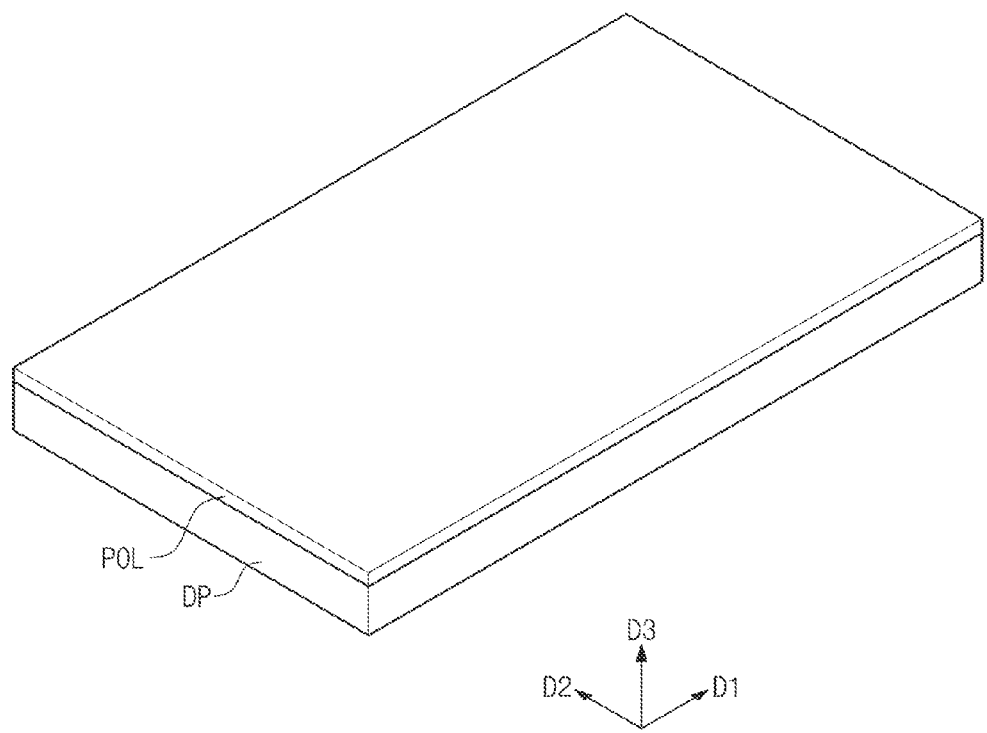
FIG. 1 is a perspective view of a display device according to an exemplary embodiment of the present invention.

The present invention will be described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of elements may be exaggerated for clarity. Like reference numerals in the drawings denote like elements.

It will be understood that when a layer is referred to as being "on" another layer or substrate, it can be directly on the other layer or substrate, or intervening layers may also be present. In addition, it will also be understood that when one side of a layer is illustrated as planar, the side is not necessarily planar. A step may be generated on the surface of an upper layer according to the surface shape of a lower layer during stacking. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 2:
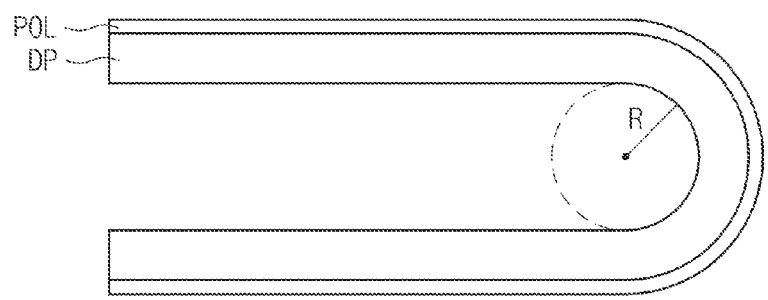
FIG. 2 is a side view of a folded state of a display device according to an exemplary embodiment of the present invention.
Figure 3:
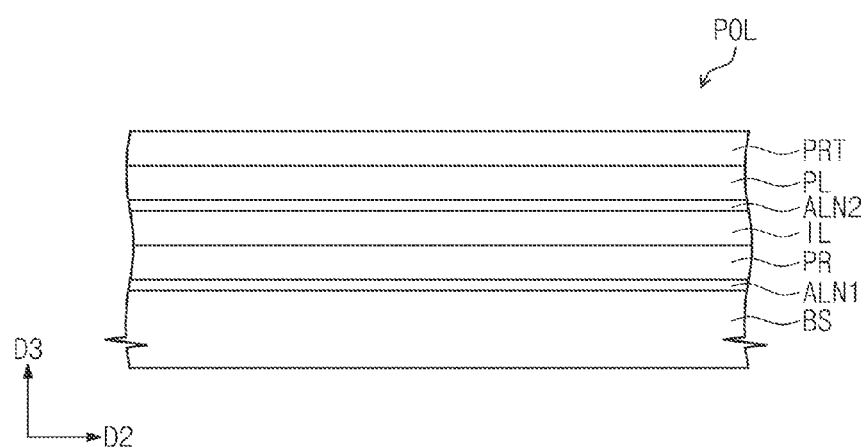
FIG. 3 is a cross-sectional view of a polarizer according to an exemplary embodiment of the present invention.
Figure 4:
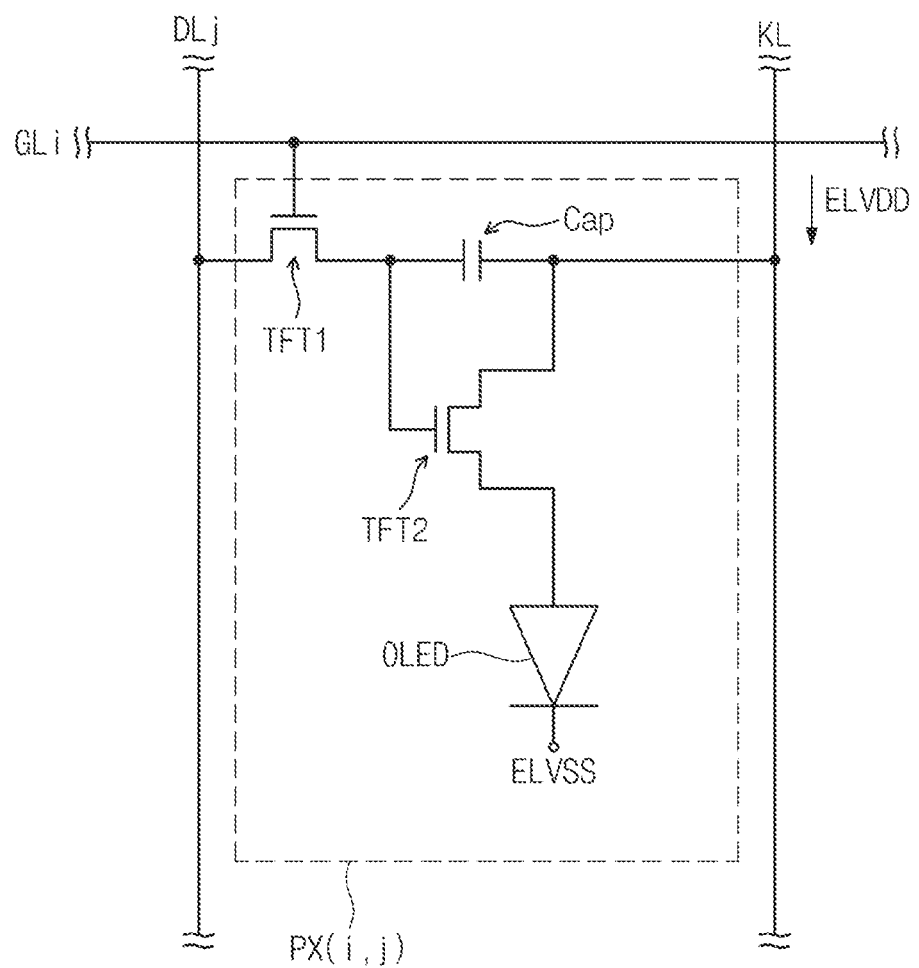
FIG. 4 is an equivalent circuit diagram of a pixel according to an exemplary embodiment of the present invention.
Figure 5:
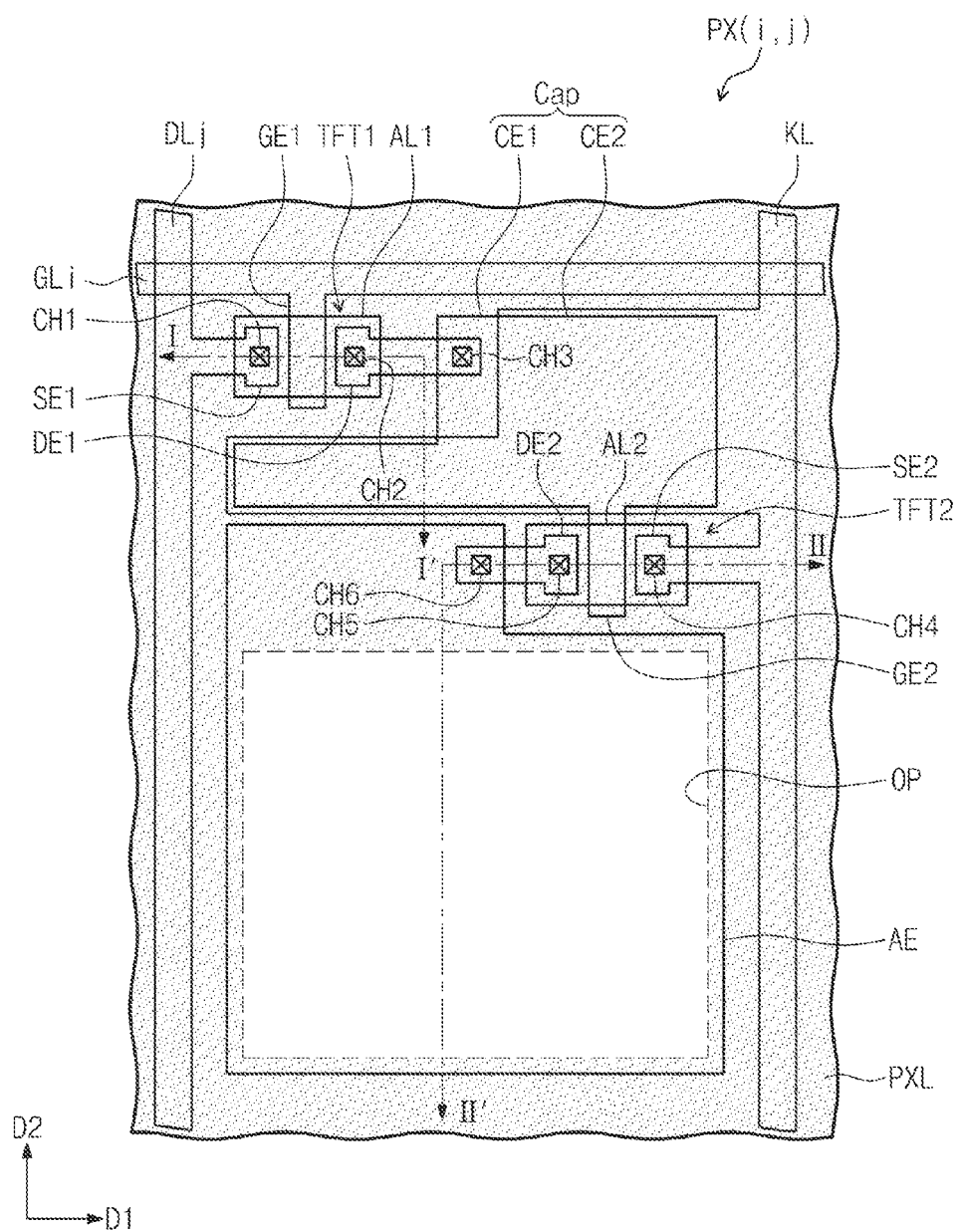
FIG. 5 is a layout of a pixel according to an exemplary embodiment of the present invention.

As shown in FIGS. 1 to 3, the display device is a flexible display device having at least one flexible portion. The display device includes a display panel DP and a polarizer POL provided on one side of the display panel DP. Even though not shown, the display panel DP and the polarizer POL may be combined by a sticking agent or an adhesive provided therebetween. The sticking agent may be an ultraviolet curable sticking agent.

The display panel DP displays images in a front direction, and may have various shapes. For example, the display panel DP may be provided as a rectangular plate shape having two pairs of parallel sides, as shown in FIG. 1. When the display device is provided as a rectangular plate shape, one pair of the two pairs of the sides may be longer than other pair of the sides. A display device of a rectangular shape having one pair of long sides and one pair of short sides is illustrated for convenience of explanation. The extended direction of the long sides corresponds to a first direction D1, and the extended direction of the short sides corresponds to a second direction D2. In this case, a direction in which images are provided, that is, a front direction, corresponds to a third direction D3.

The display panel DP includes a base substrate (not shown), signal wirings (not shown) disposed on the base substrate (not shown), and pixels (not shown) electrically connected to the signal wirings. Each of the pixels includes display devices (not shown). The display devices generate images based on received signals from the signal wirings. The display panel DP displays the images, and is not specifically limited. The display panel DP may include, for example, an organic electric field light-emitting display panel, a liquid crystal display panel, an electrophoretic display panel, an electrowetting display panel, and the like. Hereinafter, an exemplary embodiment of the present invention will be explained with respect to an organic light-emitting display panel as the display panel DP.

At least a portion of the display device of the inventive concept may have flexibility, and the portion having the flexibility may be bent or rolled so as to provide a curved surface overall. In a specific area, the display device may be folded. As shown in FIG. 2, the display device may be folded in the second direction D2 on the display surface of the display device defined by the first direction D1 and the second direction D2.

The display device may be completely folded so that two areas of the display device may face each other. The display device may have a specified radius of curvature at the folded area.

The polarizer POL includes a base film BS, a first alignment layer ALN1, a phase delay layer PR, an interlayer IL, a second alignment layer ALN2, a polarizing layer PL, and a passivation layer PRT stacked one-by-one.

The base film BS may be formed by using an elastic insulating material. The base film BS may be formed by using a plastic film having elasticity, such as a silicon or polyurethane elastic body.

The base film BS may be selected from a material having good transparency, mechanical strength, thermal stability, moisture shielding properties, isotropic properties, as well as the elasticity. For example, the plastic film may include an elastic material such as polyester, including, polyethylene terephthalate, polyethylene isophthalate, and polybutylene terephthalate, cellulose, including diacetyl cellulose, and triacetyl cellulose, polycarbonate, polyacryl, and the like. These materials may be used in place of the silicon or polyurethane.

The base film BS may have a phase delay value of substantially zero. That is, in the case when one side of the base film BS is set to an x-y plane, an upper direction perpendicular to the n-y plane is set to the z-axis, and refractive index with respect to each of the x-axis, the y-axis, and the z-axis is set to $n_x$, $n_y$, and $n_z$, the delay value of light in the z-axis direction ($R_{th}$) and the delay value of light with respect to the x-y plane ($R_o$) may be less than about 10 nm, for example, substantially zero, respectively. In this case, $R_{th}$ and $R_o$ may be defined by the following Equations 1 and 2. In the following Equations, d represents the thickness of the base film BS.

$$R_{th}=\{(n_x+n_y)/2-n_z\}\times d \quad \text{[Equation 1]}$$

$$R_o=(n_x-n_y)\times d \quad \text{[Equation 2]}$$

The first alignment layer ALN1 is provided on the base film BS. The first alignment layer ALN1 aligns the liquid crystals of a phase delay layer PR explained below. The first alignment layer ALN1 may be formed by using a polymer such as polyimide, polyamic acid, polyamide, polyamic imide, polyester, polyethylene, polyurethane, polystyrene, polysiloxane, or combinations thereof. The first alignment layer ALN1 may be initially aligned by using an optical aligning method, and a rubbing process may be additionally carried out. According to the alignment direction of the first alignment layer ALN1, the aligning direction (pretilt direction) of the liquid crystals of the phase delay layer PR may be determined.

The phase delay layer PR is a layer delay the phase of light passing therethrough. The phase delay layer PR may delay the phase of the light by $\lambda/4$, when the wavelength of the light is $\lambda$. In this case, linearly polarized incident light may be left-circularly polarized after passing through the phase delay layer PR. The left-circularly polarized light may be right-circularly polarized after being reflected by the display panel DP. The right-circularly polarized light may be linearly polarized after passing through the phase delay layer.

The phase delay layer PR includes a first liquid crystal composition including first liquid crystals, a first antioxidant, and a derivative of the first antioxidant.

The first liquid crystals may be nematic liquid crystals.

The first antioxidant prevents the oxidation of the first liquid crystals, which may occur during or after the manufacturing process of the phase delay layer PR, without inhibiting the optical properties of the phase delay layer PR. That is, the oxidation of the first liquid crystals by light, heat, and an initiator, may be prevented by the first antioxidant. Particularly, the transformation of the first liquid crystals, due to radicals and/or ions generated from the first alignment layer ALN1 and diffused into the phase delay layer PR during the manufacturing process, may be prevented. The derivative of the first antioxidant refers to an intermediate product or a by-product produced when the antioxidant prevents the oxidation of the first liquid crystals.

The first antioxidant may be included in the first liquid crystal composition at a concentration of about 0 ppm to about 150 ppm, with respect to the total amount of the first liquid crystal composition. The total concentration of the antioxidant and the derivative thereof in the first liquid crystal composition is generally about 10 ppm to about 10,000 ppm.

The first antioxidant may be at least one selected from the group consisting of alkylated monophenol, alkylthio methyl phenol, hydroquinone, alkylated hydroquinone, tocopherol, hydroxylated thiodiphenyl ether, alkylidene bisphenol, O-, N-, and S-benzyl compounds, hydroxybenzylated malonate, aromatic hydroxybenzyl compounds, triazine compounds, benzyl phosphonate, acylamino phenol, mono- or poly-alcohols, an ester of mono- or poly-alcohols and β-(3,5-di-tert-butyl-4-hydroxyphenyl)-propionic acid, an ester of mono- or poly-alcohols and β-(5-tert-butyl-4-hydroxy-3-methylphenyl)-propionic acid, an ester of mono- or poly-alcohols and β-(3,5-dicyclohexyl-4-hydroxyphenyl)-propionic acid, an ester of mono- or poly-alcohols and 3,5-di-tert-butyl-4-hydroxyphenyl acetic acid, an amide of β-(3,5-di-tert-butyl-4-hydroxyphenyl)-propionic acid, ascorbic acid, and an amine antioxidant.

Examples of the first antioxidant will be explained in detail hereinafter:

(1) alkylated monophenol, for example, 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-di-cyclopentyl-4-methylphenol, 2-(α-methylcyclohexyl)-4,6-dimethylphenol, 2,6-di-octadecyl-4-methylphenol, 2,4,6-tricyclohexylphenol, 2,6-di-tert-butyl-4-methoxymethylphenol, a nonylphenol having a nonyl group having a straight chain or a branched side chain, such as 2,6-di-nonyl-4-methylphenol, 2,4-dimethyl-6-(1'-methyl-undec-1'-yl)-phenol, 2,4-dimethyl-6-(1'-methyl-heptadec-1'-yl)-phenol, 2,4-dimethyl-6-(1'-methyl-tridec-1'-yl)-phenol, and combinations thereof;

(2) alkylthio methyl phenol, for example, 2,4-di-octylthiomethyl-6-tert-butylphenol, 2,4-di-octylthiomethyl-6-methylphenol, 2,4-dioctylthiomethyl-6-ethylphenol, 2,6-di-dodecylthiomethyl-4-nonylphenol, and combinations thereof;

(3) hydroquinone and alkylated hydroquinone, for example, 2,6-di-tert-butyl-4-methoxyphenol, 2,5-di-tert-butyl-hydroquinone, 2,5-di-tert-amylhydroquinone, 2,6-diphenyl-4-octadecyloxyphenol, 2,6-di-tert-butyl-hydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate, and combinations thereof;

(4) tocopherol, for example, α-tocopherol, β-tocopherol, γ-tocopherol, δ-tocopherol and combinations thereof (vitamin E);

(5) hydroxylated thiodiphenyl ether, for example, 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide, and combinations thereof;

(6) alkylidenebisphenol, for example, 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol,1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycolbis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)-propane, 2,2-bis(5-tert-butyl-4-hydroxy-2-methylphenyl)-4-n-dodecylmercaptobutane, 1,1,5,5-tetra (5-tert-butyl-4-hydroxy-2-methylphenyl)pentane, and combinations thereof;

(7) O-, N- and S-benzyl compounds, for example, 3,5,3',5'-tetra-tert-butyl-4,4'-dihydroxy-dibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzyl mercaptoacetate, and combinations thereof;

(8) hydroxybenzylated malonate, for example, dioctadecyl-2,2-bis(3,5-di-tert-butyl-2-hydroxybenzyl)malonate, di-octadecyl-2-(3-tert-butyl-4-hydroxy-5-methylbenzyl)-malonate, di-dodecylmercaptoethyl-2,2-bis(3,5-di-tert-butyl-4-hydroxybenzyl)malonate, bis-[4-(1,1,3,3-tetramethyl-butyl)phenyl]-2,2-bis(3,5-di-tert-butyl-4-hydroxybenzyl) malonate, and combinations thereof;

(9) aromatic hydroxybenzyl compounds, for example, 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol, and combinations thereof;

(10) triazine compounds, for example, 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl)isocyanurate, and combinations thereof;

(11) benzyl phosphonate, for example, dimethyl-2,5-di-tert-butyl-4-hydroxybenzyl phosphonate, diethyl-3,5-di-tert-butyl-4-hydroxybenzyl phosphonate, dioctadecyl-3,5-di-tert-butyl-4-hydroxybenzyl phosphonate, dioctadecyl-5-tert-butyl-4-hydroxy-3-methylbenzyl phosphonate, a potassium salt of monoethyl ester of 3,5-di-tert-butyl-4-hydroxybenzyl-phosphonic acid, and combinations thereof;

(12) acylaminophenol, for example, 4-hydroxylauranilide, 4-hydroxystearanilide, octyl N-(3,5-di-tert-butyl-4-hydroxyphenyl)carbamate, and combinations thereof;

(13) ester of mono- or poly-alcohol and β-(3,5-di-tert-butyl-4-hydroxyphenyl)-propionic acid; the mono- or poly-alcohol includes, for example, methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane, and combinations thereof;

(14) ester of mono- or poly-alcohol and β-(5-tert-butyl-4-hydroxy-3-methylphenyl)-propionic acid; the mono- or poly-alcohol includes, for example, methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane, 3,9-bis[2-{3-(3-tert-butyl-4-hydroxy-5-methylphenyl)propionyloxy}-1,1-dimethylethyl]-2,4,8,10-tetraoxaspiro[5.5]-undecane, and combinations thereof;

(15) ester of mono- or poly-alcohol and β-(3,5-dicyclohexyl-4-hydroxyphenyl)-propionic acid; the mono- or poly-alcohol includes, for example, methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo-[2.2.2]octane, and combinations thereof;

(16) ester of mono- or poly-alcohol and 3,5-di-tert-butyl-4-hydroxyphenyl acetic acid; the mono- or poly-alcohol includes, for example, methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo-[2.2.2]octane, and combinations thereof;

(17) amide of β-(3,5-di-tert-butyl-4-hydroxyphenyl)propionic acid, for example, N,N'-bis(3,5-di-tert-butyl-4-hydroxyphenylpropionic acid)hexamethylenediamide, N,N'-bis(3,5-di-tert-butyl-4-hydroxyphenylpropionyl) trimethylenediamide, N,N'-bis(3,5-di-tert-butyl-4-hydroxyphenylpropionyl)hydrazide, N,N'-bis[2-3-[3,5-di-tert-butyl-4-hydroxyphenyl]propionyloxy)ethyl]oxamide (Naugard®XL-1, purchased from Uniroyal industries Ltd.), and combinations thereof;

(18) ascorbic acid (vitamin C); and

(19) an amine antioxidant, for example, N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphtyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)-diphenylamine, N,N'-dimethyl-N,N'-di-sec-butyl-p-phenylenediamine, diphenylamine, N-allyldiphenylamine, 4-isopropoxydi phenylamine, N-phenyl-1-naphtylamine, N-(4-tert-octylphenyl)-1-naphtylamine, N-phenyl-2-naphtylamine, octylated diphenylamine, for example, p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis (4-methoxyphenyl)amine, 2,6-di-tert-butyl-4-dimethylaminomethylphenol, 2,4'-di-aminodiphenylmethane, 4,4'-diaminodiphenylmethane, N,N,N',N'-tetramethyl-4,4'-di-aminodiphenylmethane, 1,2-bis[(2-methylphenyl)amino] ethane, 1,2-bis(phenylamino)propane, (o-tolyl)biguanide, bis[4-(1',3'-dimethylbutyl)phenyl]amine, tert-octylated N-phenyl-1-naphtylamine, a mixture of mono- and dialkylated tert-butyl/tert-octyldiphenylamine, a mixture of mono- and dialkylated nonyldiphenylamine, a mixture of mono- and dialkylated nonyldiphenylamine, a mixture of mono- and dialkylated dodecyldiphenylamine, a mixture of mono- and dialkylated isopropyl/isohexyldiphenylamine, a mixture of mono- and dialkylated tert-butyldiphenylamine, 2,3-di-hydro-3,3-dimethyl-4H-1,4-benzothiazine, phenothiazine, a mixture of mono- and dialkylated tert-butyl/tert-octylphenotiazine, a mixture of mono- and dialkylated tert-octyl-phenothiazine, N-allylphenothiazine, N,N,N',N'-tetraphenyl-1,4-diaminobut-2-ene, N,N-bis(2,2,6,6-tetramethylpiperide-4-yl-hexamethylenediamine, bis(2,2,6,6-tetramethylpiperide-4-yl)sebacate, 2,2,6,6-tetramethylpiperidine-4-on, 2,2,6,6-tetramethylpiperidine-4-ol, and combinations thereof.

As the first antioxidant, commercialized materials may be used. Examples of commercially available antioxidants may include at least one of the following materials.

2,2'-Thiodiethylene bis[3-(3,5-di-t-butyl-4-hydroxyphenyl)propionate] available as ANOX® 70 (CAS 41484-35-9), 1,3,5-trimethyl-2,4,6-tris(3,5-di-tert-4-hydroxybenzyl)benzene available as ANOX® 330 (CAS 1709-70-2), a C13-C15 alkyl ester of 3,5-bis(1,1-dimethylethyl)-4-hydroxy-benzenepropanoic acid available as ANOX® 1315 (CAS 171090-93-0), a C13-C15 alkyl ester of 3,5-bis(1,1-dimethylethyl)-4-hydroxy-benzenepropanoic acid available as ANOX® PP18 (CAS 2082-79-3), 1,3,5-tris(4-tert.-butyl-3-hydroxy-2,6-dimethylbenzyl)-1,3,5-triazine-2,4,6-(1H,3H,5H)-trione available as LOWINOX® 1790 (CAS 40601-76-1), 2,2'-methylenebis(6-t-butyl-4-methylphenol) available as LOWINOX® 22M46 (CAS 119-47-1), 1,1-bis(2-methyl-4-hydroxy-5-tert-butylphenyl)butane available as LOWINOX® 44B25 (CAS 85-60-9), 1,1,3-tris(2'-methyl-4'-hydroxy-5'-t-butylphenyl)butane available as LOWINOX® CA22 (CAS 1843-03-4), a butylated reaction product of p-cresol and dicyclopentadiene available as LOWINOX® CPL (CAS 68610-51-5), triethyleneglycol-bis[3-(3-t-butyl-4-hydroxy-5-methyphenyl)propionate] available from LOWINOX® GP45 (CAS 36443-68-2), N,N'-hexamethylene bis[3-(3,5-di-t-butyl-4-hydroxyphenyl)propionamide available as LOWINOX® HD98 (CAS 23128-74-7), 2,2'-thiobis(6-t-butyl-4-methylphenol) available as LOWINOX® TBP6 (CAS 90-66-4), F2,2' methylenebis[4-methyl-6-(1-methyl-cyclohexyl)phenol] available as LOWINOX® WSP (CAS 77-62-3), or 2,2'-methylenebis (6-nonyl-p-cresol) available as NAUGARD® 536 (CAS 7786-17-6).

The interlayer IL may be formed as an organic layer or an inorganic layer. The interlayer IL may passivate the phase delay layer PR, and may have a pencil hardness of at least about 2H. The interlayer IL may be omitted when another layer is added (for example, when the second alignment layer ALN2 is added) onto the phase delay layer PR. The interlayer IL may include polysiloxane, silicon nitride, an inorganic oxide such as silicon oxide and silicon oxynitride, and the like. The interlayer IL may absorb light having a specific wavelength, such as ultraviolet light.

The second alignment layer ALN2 is provided on the interlayer IL (on the phase delay layer PR in case that the interlayer IL is not provided). The second alignment layer ALN2 aligns liquid crystal molecules in a polarizing layer PL that will be explained hereinafter. The second alignment layer ALN2 may be formed by using the same material as, or a different material from, the first alignment layer ALN1. The second alignment layer ALN2 may be formed by using a polymer such as polyimide, polyamic acid, polyamide, polyamic imide, polyester, polyethylene, polyurethane, polystyrene and polysiloxane, or combinations thereof. The second alignment layer ALN2 may be initially aligned by using an optical alignment method, and a rubbing process may be additionally conducted.

According to the alignment direction of the second alignment layer, the alignment direction (pretilt direction) of the liquid crystals of the polarizing layer PL may be determined.

The polarizing layer PL polarizes light passing therethrough in a specific direction. The optical axis of the polarizing layer PL and the optical axis of the phase delay layer PR may form an angle of about 45 degrees. The polarizing layer PL may have a refractive anisotropy of about 0.08-0.25.

The polarizing layer PL includes a second liquid crystal composition including second liquid crystals, a second antioxidant, and a derivative of the second antioxidant.

The polarizing layer PL may be an O-type polarizing layer or an E-type polarizing layer.

The O-type polarizing layer includes a dichroic dye as a guest and the second liquid crystals as a host. The second liquid crystals may be nematic liquid crystals. The second liquid crystals may be smectic A-type liquid crystals or smectic B-type liquid crystals. The dichroic dye may be a perylene-based dye. Through the alignment of the dichroic dye and the nematic liquid crystal molecules in a certain direction, the O-type polarizing layer may have an optical axis.

The E-type polarizing layer includes lyotropic liquid crystals. The lyotropic liquid crystal molecules may be discotic liquid crystals. Through the alignment of the discotic liquid crystals in a certain direction, the E-type polarizing layer may have an optical axis.

The second antioxidant prevents the oxidation of the second liquid crystals which may be generated during or after the manufacturing process of the polarizing layer PL.

The second antioxidant prevents the oxidation of the second liquid crystals, without inhibiting the optical properties of the polarizing layer PL. That is, the antioxidant prevents the oxidation of the second liquid crystals due to light, heat, and an initiator. Particularly, the transformation of the second liquid crystals, due to radicals and/or ions generated from the second alignment layer ALN2 and diffused to the polarizing layer PL, may be prevented.

The second antioxidant may be included in the second liquid crystal composition by the concentration of about 0 ppm to about 150 ppm, with respect to the total second liquid crystal composition. The total concentration of the antioxidant and the derivative thereof in the second liquid crystal composition is about 10 ppm to about 10,000 ppm.

The second antioxidant is substantially the same as the first antioxidant, and repeated explanation will be omitted.

The passivation layer PRT passivates the polarizing layer PL. The passivation layer PRT may be formed as an organic layer or an inorganic layer. The interlayer IL may include polysiloxane, silicon nitride, an inorganic oxide such as silicon oxide, silicon oxynitride, and the like. The interlayer IL may absorb light having a specific wavelength, such as ultraviolet light.

The polarizer POL having the above-described structure may have flexibility and may delay the phase of the light passing therethrough, and may be applied in a display device by an attaching method to a display panel DP. Hereinafter, a display device according to an exemplary embodiment of the present invention.

The display device includes pixels aligned in a matrix. In FIGS. 4 to 7, a pixel PX(i, j) disposed in an i-th column and a j-th row is illustrated as an example.

Referring to FIGS. 4 to 7, the pixel PX(i, j) receives a gate signal from an i-th gate line GLi, and receives a data signal from a j-th data line DLj. The pixel PX(i, j) receives a first electric source voltage ELVDD from a power source line KL.

The pixel PX(i, j) includes an organic light-emitting diode OLED as a display device. The pixel PX(i, j) includes a first thin film transistor TFT1, a second thin film transistor TFT2, and a capacitor Cap as circuit parts for driving the organic light-emitting diode OLED.

The first thin film transistor TFT1 outputs a data signal applied to the j-th data line DLj in response to a gate signal applied to the i-th gate line GLi. The capacitor Cap charges a charge amount corresponding to the difference between a voltage corresponding to the data signal received from the first thin film transistor TFT1 and the first electric source voltage ELVDD.

The second thin film transistor TFT2 is connected to the organic light-emitting diode OLED. The second thin film transistor TFT2 controls a driving current flowing through the organic light-emitting diode OLED according to a stored charge amount in the capacitor Cap.

The organic light-emitting diode OLED includes a first electrode (not shown) connected to the second thin film transistor TFT2 and a second electrode (not shown) receiving a second electric source voltage ELVSS. The second electric source voltage ELVSS has a lower level than the first electric source voltage ELVDD. In addition, the organic light-emitting diode OLED includes at least an organic light-emitting layer disposed between the first electrode and the second electrode. The organic light-emitting diode OLED emits light during the turned-on section of the second thin film transistor TFT2.

According to the kind of the display panel DP, the pixel PX(i, j) may be included in other display devices. For example, an electrophoretic display panel may include two electrodes and electrophoretic particles as a display device. An electrowetting display panel may include two electrodes and electronic inks. In addition, circuits for driving the display device may be changed according to the kind of the display device.

In an exemplary embodiment, the display panel DP is explained as an organic light-emitting display panel including an organic light-emitting diode. In more detail with reference to the attached drawings, the display panel DP includes a base substrate SUB, signal wirings GLi and DLj, a pixel PX(i, j), and an encapsulating layer ECL. The polarizer POL is combined with the encapsulating layer ECL.

The base substrate SUB includes a flexible plastic substrate. On the base substrate SUB, the gate line GLi, the data line DLj, a power source line KL, and the pixel PX(i, j) are disposed.

On the base substrate SUB, a semiconductor pattern of the first thin film transistor TFT1 (hereinafter, will be referred to as a first semiconductor pattern AL1) and a semiconductor pattern of the second thin film transistor TFT2 (hereinafter, will be referred to as a second semiconductor pattern AL2). On the base substrate SUB, a first insulating layer INS1 covering the first semiconductor pattern AL1 and the second semiconductor pattern AL2, is disposed. The first insulating layer INS1 includes an organic layer and/or an inorganic layer. The first insulating layer INS1 may include a plurality of thin films.

On the first insulating layer INS1, a control electrode of the first thin film transistor TFT1 (hereinafter, referred to as a "first control electrode GE1") and a control electrode of the second thin film transistor TFT2 (hereinafter, referred to as a "second control electrode GE2") are disposed. On the first insulating layer INS1, a first electrode CE1 of the capacitor Cap is disposed.

On the first insulating layer INS1, a second insulating layer INS2 covering the first control electrode GE1, the second control electrode GE2, and the first electrode CE1, is disposed. The second insulating layer INS2 includes an organic layer and/or an inorganic layer. The insulating layer INS2 may include a plurality of thin films.

On the second insulating layer INS2, an input electrode of the first thin film transistor TFT1 (hereinafter, referred to as a "first input electrode SE1") and an output electrode of the first thin film transistor TFT1 (hereinafter, referred to as a "first output electrode DE1") are disposed. On the second insulating layer INS2, an input electrode of the second thin film transistor TFT2 (hereinafter, referred to as a "second input electrode SE2") and an output electrode of the second thin film transistor TFT2 (hereinafter, referred to as a "second output electrode DE2") are disposed. On the second insulating layer INK, a second electrode CE2 of the capacitor Cap is disposed.

Figure 6:
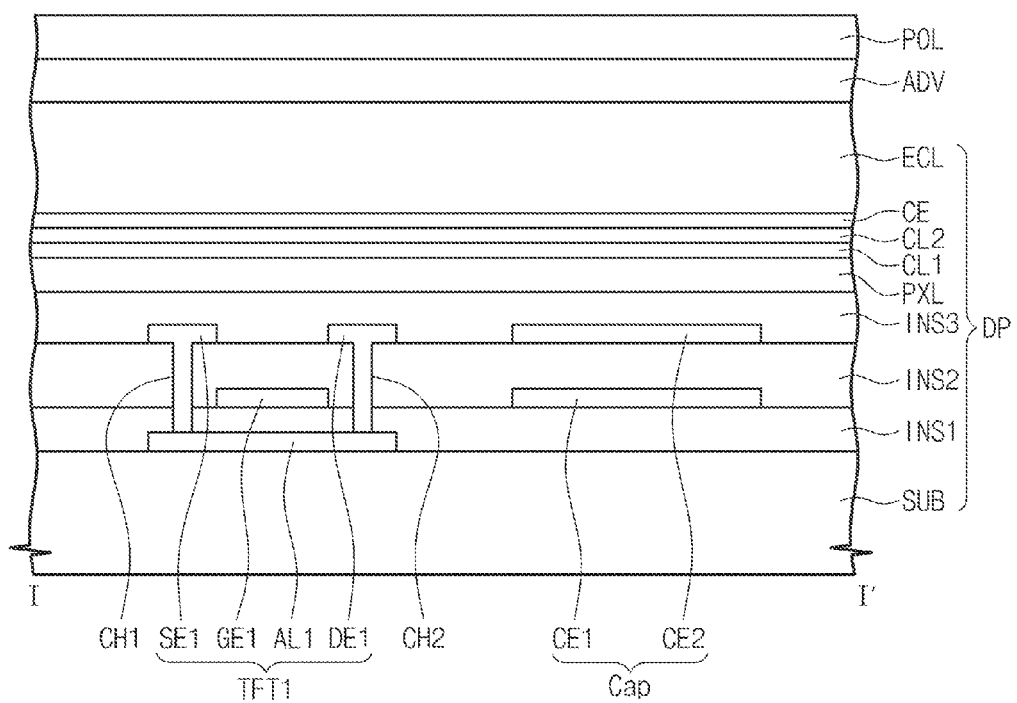
FIG. 6 is a cross-sectional view of a display device taken along line I-I' of FIG. 5.
Figure 7:
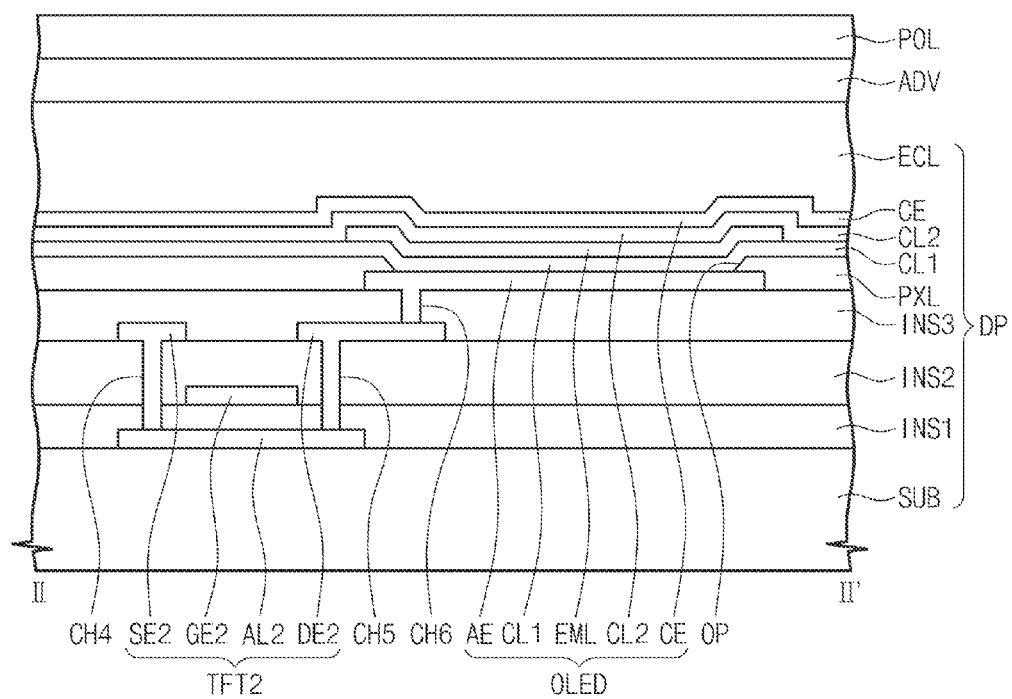
FIG. 7 is a cross-sectional view of a display device taken along line II-II' of FIG. 5.

The first input electrode SE1 and the first output electrode DE1 are respectively connected to the first semiconductor pattern AL1 through a first through hole CH1 penetrating the first insulating layer INS1 and the second insulating layer INS2, and a second through hole CH2 penetrating the first insulating layer INS1 and the second insulating layer INS2, as shown in FIG. 6. The first output electrode DE1 is connected to the first electrode CE1 through a third through hole CH3 penetrating the second insulating layer INS2. The second input electrode SE2 and the second output electrode DE2 are respectively connected to the second semiconductor pattern AL2 through a fourth through hole CH4 penetrating the first insulating layer INS1 and the second insulating layer INS2, and a fifth through hole CH5 penetrating the first insulating layer INS1 and the second insulating layer INS2. The first thin film transistor TFT1 and the second thin film transistor TFT2 may alternatively have a bottom gate structure.

On the second insulating layer INS2, a third insulating layer INS3 covering the first input electrode SE1, the first output electrode DE1, the second input electrode SE2, and the second output electrode DE2, is disposed. The third insulating layer INS3 includes an organic layer and/or an inorganic layer. The third insulating layer INS3 may include a plurality of thin films.

On the third insulating layer INS3, a pixel defining layer PXL and an organic light-emitting diode OLED are disposed. The organic light-emitting diode OLED includes an anode AE, a first common layer CL1, an organic light-emitting layer EML, a second common layer CL2, and a cathode CE stacked one-by-one. The anode AE is connected to the second output electrode DE2 through a sixth through hole CH6 penetrating the third insulating layer INS3. The positions of the anode AE and the cathode CE may be switched based on the light-emitting direction of the organic light-emitting diode OLED.

The anode AE is disposed on the third insulating layer INS3. An opening portion OP of the pixel defining layer PXL exposes the anode AE. The first common layer CL1 is disposed on the anode AE. The first common layer CL1 is disposed on the base substrate SUB overall. The first common layer CL1 includes a hole injection layer. The first common layer CL1 may further include a hole transport layer.

The organic light-emitting layer EML is disposed on the first common layer CL1. The organic light-emitting layer EML is disposed only in an area corresponding to the opening portion OP. A second common layer CL2 is disposed on the organic light-emitting layer EML. The second common layer CL2 is disposed on the base substrate SUB overall, similar to the first common layer CL1. The second common layer CL2 includes an electron injection layer. The second common layer CL2 may further include an electron transport layer. On the second common layer CL2, the cathode CE is disposed. The cathode CE is disposed on the base substrate SUB overall.

On the cathode CE, an encapsulating layer ECL is disposed. The encapsulating layer ECL includes an organic layer and/or an inorganic layer. In another exemplary embodiment, a fourth insulating layer for planarization may be further disposed between the cathode CE and the encapsulating layer ECL. In addition, the encapsulating layer ECL may be replaced with an encapsulating substrate.

On the encapsulating layer ECL, the polarizer POL is disposed.

In a display device having the above-described structure, incident light from the outside is incident through the polarizer POL on the display panel DP. The incident light is linearly polarized while passing through the polarizing layer PL of the polarizer POL. After passing through the phase delay layer PR, the linearly polarized incident light is reflected on the display panel DP. The light reflected on the display panel DP passes the phase delay layer PR again and is incident on the polarizing layer PL. The phase of the linearly polarized incident light is changed according to the passage thereof. Most of the phase changed light would not pass the polarizing layer PL and would be extinguished.

On the contrary, the light EL generated at the organic light-emitting diode OLED passes through the phase delay layer PR and the polarizing layer PL, and is provided to the outside. As a result, the polarizing layer PL and the phase delay layer PR provide the light generated at the organic light-emitting diode OLED to the outside, and prevent the reflection of the incident light. Thus, the visibility of the display device is improved.

Figure 8:
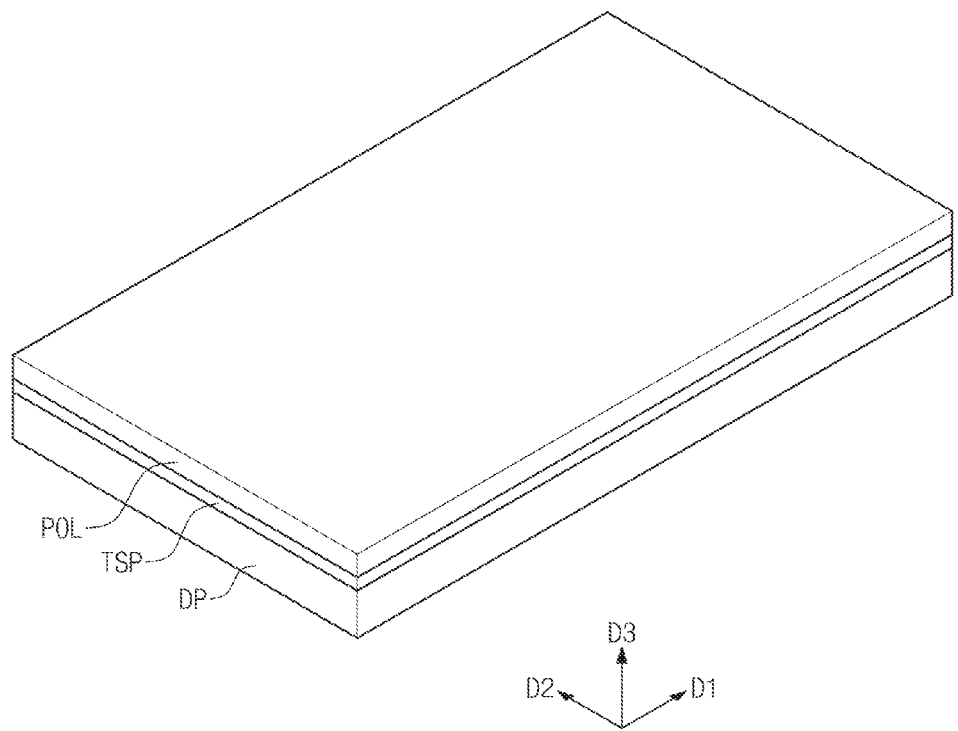
FIG. 8 is a perspective view of a display device according to an exemplary embodiment of the present invention.

FIG. 8 is a perspective view of a display device according to another exemplary embodiment. For convenience of explanation, only the differences between this exemplary embodiment and the above-described exemplary embodiment will be described in detail. Referring to FIG. 8, a display device includes a display panel DP, a polarizer POL provided on one side of the display panel DP, and a touch sensor TSP.

The touch sensor TSP senses the touch event of a user. The touch sensor TSP may be formed to have substantially the same area and the same shape as the display panel DP in a planar view. For example, the touch sensor TS may cover a corresponding display area of the display device.

The kind or the shape of the touch sensor TSP is not particularly limited in the exemplary embodiments. For example, the touch sensor TSP may be a capacitive touch sensor, a resistive touch sensor, a sonic touch sensor, a light sensor, a piezoelectric sensor, and the like. In addition, although the touch sensor TSP is provided on the display panel DP as a separate layer in FIG. 8, it is not limited thereto. For example, the touch sensor TSP may be provided as a plurality of layers, or may be provided on a portion of the display panel DP. Although not illustrated, a sticking agent or an adhesive may be provided between the touch sensor and the polarizer POL. The sticking agent may be an ultraviolet curable sticking agent.

In an exemplary embodiment, the polarizer POL may function as a polarizer POL and may play the role of passivating the touch sensor TSP at the same time.

Figure 9:
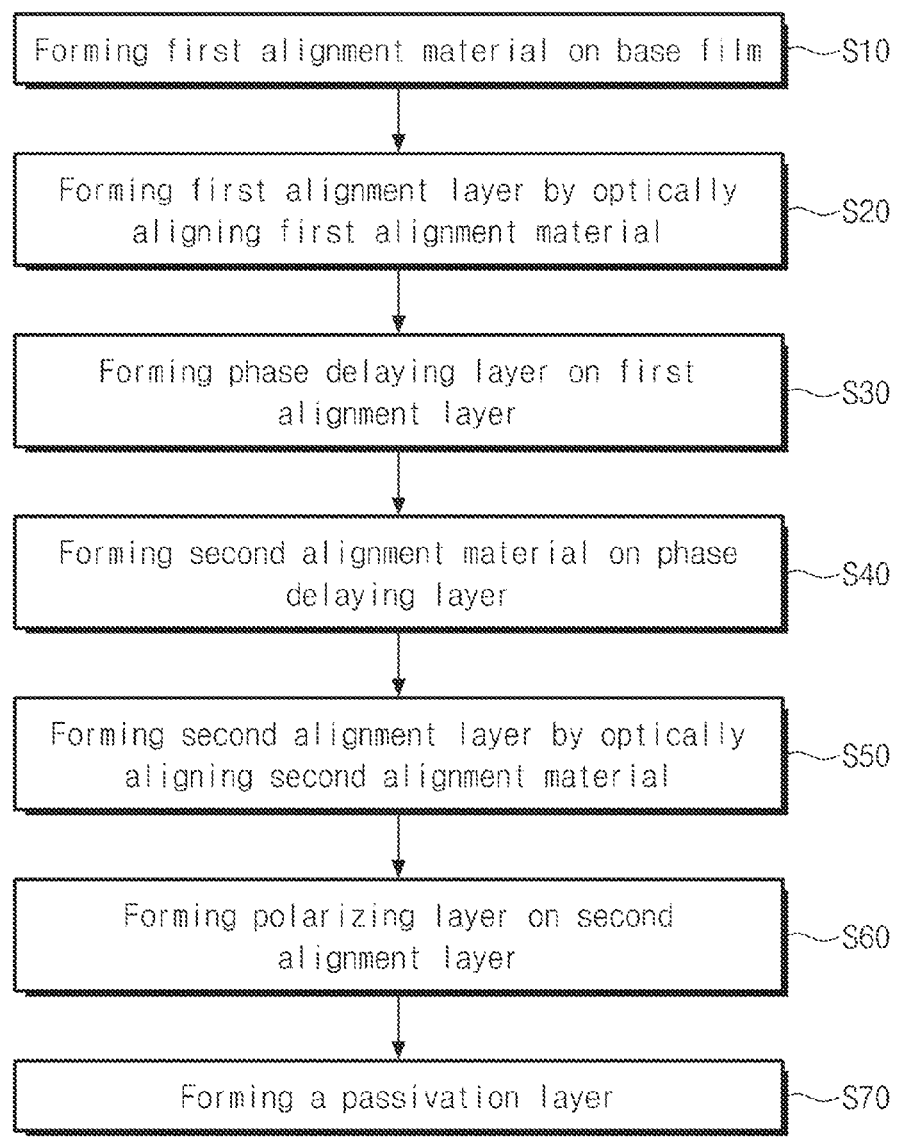
FIG. 9 is a flowchart illustrating a method of manufacturing a polarizer according to an exemplary embodiment of the present invention.

FIG. 9 is a flowchart illustrating a method of manufacturing a polarizer according to an exemplary embodiment of the present invention.

The polarizer may be manufactured by forming a first alignment material on a base film (Step S10), forming a first alignment layer by optically aligning the first alignment material (Step S20), forming a phase delay layer on the first alignment layer (Step S30), forming a second alignment material on the phase delay layer (Step S40), forming a second alignment layer by optically aligning the second alignment material (Step S50), forming a polarizing layer on the second alignment layer (Step S60), and forming a passivation layer (Step S70).

Referring to FIG. 9, the first alignment material is formed on the base film (Step S10). The first alignment material includes a monomer, a dimer, or a precursor of a polymer such as polyimide, polyamide, and polysiloxane.

Light is applied to the first alignment material, and the first alignment material is polymerized by the light to form the first alignment layer (Step S20). The light may be ultraviolet light or an ion beam. The first alignment layer may have a directional nature based on the applied direction of the light.

On the first alignment layer, the phase delay layer is formed (Step S30). The phase delay layer may be formed by coating a liquid crystal composition including first liquid crystals and a first antioxidant. The first antioxidant may be included in the liquid crystal composition in a concentration of about 10 ppm to about 10,000 ppm, based on the total liquid crystal composition. The liquid crystal composition may further include a polymer precursor including a monomer or a dimer of a polymer forming a network between the liquid crystals, and a solvent other than the first liquid crystals. The phase delay layer may be formed by polymerizing the polymer precursor and/or conducting a curing step of removing the solvent. The curing step may be conducted by applying light or heat to the liquid crystal composition.

On the phase delay layer, an interlayer may be formed, or the interlayer may be omitted. The interlayer is formed to cover the phase delay layer and may be formed by a coating method. After coating, the interlayer may be cured using heat or light.

The second alignment layer is then formed on the interlayer (on the phase delay layer when the interlayer is omitted) (Step S40). The second alignment material includes a monomer, a dimer or a precursor of a polymer such as polyimide, polyamide, and polysiloxane.

The second alignment material is provided with light and is polymerized by the light to form the second alignment layer (Step S50). The light may be ultraviolet light. The second alignment layer has a directional nature based on the applying direction of the light.

On the second alignment layer, a polarizing layer is formed (Step S60). The polarizing layer may be formed by coating a liquid crystal composition including second liquid crystals and a second antioxidant. The polarizing layer may be formed according to the type thereof, for example, an O-type polarizing layer or an E-type polarizing layer. When the polarizing layer is the O-type polarizing layer, the polarizing layer may be formed by coating a liquid crystal composition including the second liquid crystals, a dichroic dye, and the second antioxidant.

The second antioxidant may be included in the liquid crystal composition in a concentration of about 10 ppm to about 10,000 ppm, with respect to the total liquid crystal composition. The second antioxidant may be substantially the same as, or different from, the first antioxidant.

The liquid crystal composition may further include a polymer precursor including a monomer or a dimer of a polymer forming a network between the liquid crystals, and a solvent other than the second liquid crystals. The polarizing layer may be formed by polymerizing the polymer precursor and conducting a curing step of removing the solvent.

On the polarizing layer, a passivation layer may be formed (Step S70). The passivation layer may be formed to cover the polarizing layer and may be formed by a coating method. After coating, the passivation layer may be cured using heat or light.

As described above, the curing step may be conducted by applying light or heat to the liquid crystal composition. In an exemplary embodiment of the present invention, since the light or the heat is applied in the curing step, radicals and/or ions oxidized by the light or the heat may be formed from the first and second alignment layers. The radicals and/or the ions may move to the phase delay layer and the polarizing layer, and may react with the first liquid crystals in the phase delay layer and the second liquid crystals in the polarizing layer. In this case, the phase delay layer and the polarizing layer may be transformed.

In the process of providing the light to the second alignment material, the process of curing the phase delay layer, the process of curing the polarizing layer, etc., radicals and/or ions may be formed from the first alignment layer and the second alignment layer through oxidation by the light. The radicals and/or the ions may move to the phase delay layer and the polarizing layer and may react with the first liquid crystals of the phase delay layer and the second liquid crystals of the polarizing layer. Thus, the phase delay layer and the polarizing layer may be transformed.

However, in an exemplary embodiment, the radicals and/or the ions from the first alignment layer and the second alignment layer may react with the antioxidant, and the transformation of the phase delay layer and the polarizing layer may be prevented. In particular, when optical alignment is conducted for forming the second alignment layer, the phase delay layer may be exposed to ultraviolet light having high energy. Accordingly, the generation of the radicals and/or the ions from the first alignment layer increases, and the transformation of the phase delay layer may occur frequently.

The reaction of the first antioxidant in the phase delay layer prevents the transformation of the first liquid crystals through the reaction with the ions or the radicals prior to the reaction with the first liquid crystals. The antioxidant plays the role of an H donor or a radical scavenger, and prevents the reaction of the first liquid crystals with the radicals or the ions. For example, when unstable free radicals, such as peroxide radicals, are generated, the antioxidant reacts with the peroxide radicals so as to prevent an additional radical chain reaction with the first liquid crystals.

The following Formula 1 illustrates a process of forming radicals through the oxidation of organic materials and a reaction between the peroxide radicals thus generated and a phenol-based antioxidant.

[Formula 1]

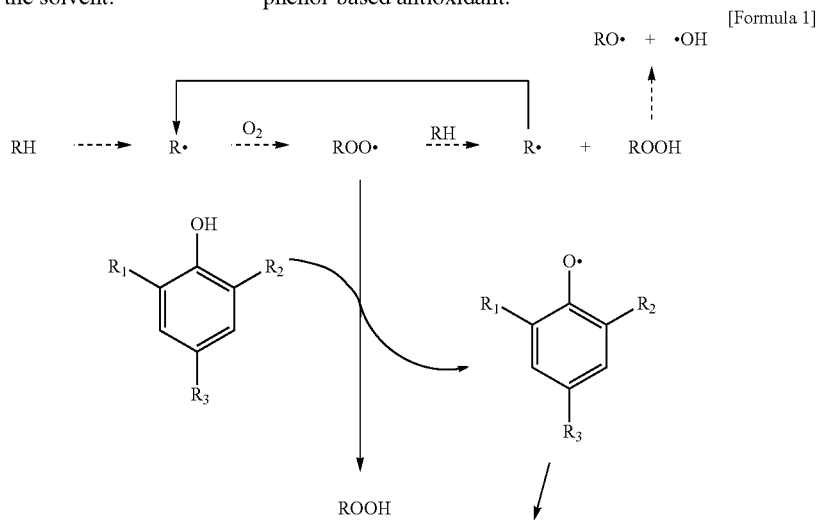

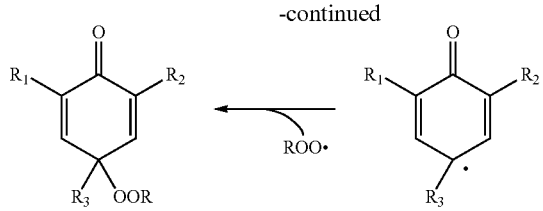

In Formula 1, R is established to simply show the generation of the peroxide, may be any functional groups connected to the peroxide generated in the first alignment layer (for example, an alkyl group having 1 to 12 carbon atoms), but is not specifically limited. In addition, R1 to R3 represent any substituents connected to a phenol group (for example, an alkyl group having 1 to 12 carbon atoms), but are not specifically limited. For example, each of R1 and R2 may be a tert-butyl group, and R3 may be a methyl group.

In this case, the antioxidant is transformed into the derivative of the above-described antioxidant, through the reaction illustrated in Formula 1. According to an exemplary embodiment, most of the antioxidant included in the first alignment material may be consumed during the curing process of the second alignment layer. In this case, the antioxidant may not be included in the final product, or a trace amount of the antioxidant may remain (for example, about 150 ppm or less). Most of the remainder is present as the derivative of the antioxidant.

As described above, in the polarizer according to an exemplary embodiment of the present invention, the undesirable transformation of the phase delay layer and/or the polarizing layer, which may be generated during the manufacturing process thereof, may be prevented. In addition, since the transformation of the phase delay layer and/or the polarizing layer is prevented, a gloss of the phase delay layer and/or the polarizing layer may be prevented. Further, additional phenomena shown by the transformation due to light or heat, for example, the physical transformation of the phase delay layer and/or the polarizing layer, may be prevented. Thus, according to an exemplary embodiment, a polarizer having high reliability with respect to light or heat may be provided. In addition, a display device having high quality may be provided by employing the polarizer of the exemplary embodiments.

It will be apparent to those skilled in the art that various modifications and variations can be made in the present invention without departing from the spirit and scope of the invention. Thus, it is intended that the present invention cover the modifications and variations of this invention provided they come within the scope of the appended claims and their equivalents.

What is claimed is:

1. A polarizer comprising:
a base film;
a first alignment layer disposed on the base film;
a phase delay layer disposed on the first alignment layer;
a second alignment layer disposed on the phase delay layer; and
a polarizing layer disposed on the second alignment layer,
wherein the phase delay layer comprises a first liquid crystal composition comprising first liquid crystals, a first antioxidant, and a derivative of the first antioxidant.

2. The polarizer of claim 1, wherein the first antioxidant is included at about 50 ppm or less, based on a total amount of the first liquid crystal composition.

3. The polarizer of claim 2, wherein the first antioxidant is at least one selected from the group consisting of alkylated monophenol, alkylthio methyl phenol, hydroquinone, alkylated hydroquinone, tocopherol, hydroxylated thiodiphenyl ether, alkylidene bisphenol, O-, N-, and S-benzyl compounds, hydroxybenzylated malonate, an aromatic hydroxybenzyl compound, a triazine compound, benzyl phosphonate, an acylamino phenol, mono- or poly-alcohol, an ester of a mono- or poly-alcohol and β-(3,5-di-tert-butyl-4-hydroxyphenyl)-propionic acid, an ester of a mono- or poly-alcohol and β-(5-tert-butyl-4-hydroxy-3-methylphenyl)-propionic acid, an ester of a mono- or poly-alcohol and β-(3,5-dicyclohexyl-4-hydroxyphenyl)-propionic acid, an ester of a mono- or poly-alcohol and 3,5-di-tert-butyl-4-hydroxyphenyl acetic acid, an amide of β-(3,5-di-tert-butyl-4-hydroxyphenyl)-propionic acid, ascorbic acid, and an amine antioxidant.

4. The polarizer of claim 2, wherein the first antioxidant is at least one selected from the group consisting of ANOX® 70 (CAS 41484-35-9), ANOX® 330 (CAS 1709-70-2), ANOX® 1315 (CAS 171090-93-0), ANOX® PP18 (CAS 2082-79-3), LOWINOX® 1790 (CAS 40601-76-1), LOWINOX® 22M46 (CAS 119-47-1), LOWINOX® 44B25 (CAS 85-60-9), LOWINOX® CA22 (CAS 1843-03-4), LOWINOX® CPL (CAS 68610-51-5), LOWINOX® GP45 (CAS 36443-68-2), LOWINOX® HD98 (CAS 23128-74-7), LOWINOX® TBP6 (CAS 90-66-4), LOWINOX® WSP (CAS 77-62-3), and NAUGARD® 536 (CAS 7786-17-6).

5. The polarizer of claim 1, wherein the polarizing layer is a guest-host type polarizer comprising a dichroic dye as a guest and second liquid crystals as a host.

6. The polarizer of claim 5, wherein the dichroic dye is a perylene-based dye, and the second liquid crystals are smectic A-type or smectic B-type liquid crystals.

7. The polarizer of claim 5, wherein the polarizing layer further comprises a second antioxidant and a derivative thereof.

8. The polarizer of claim 7, wherein the second antioxidant is at least one selected from the group consisting of alkylated monophenol, alkylthio methyl phenol, hydroquinone, alkylated hydroquinone, tocopherol, hydroxylated thiodiphenyl ether, alkylidene bisphenol, O-, N-, and S-benzyl compounds, hydroxybenzylated malonate, an aromatic hydroxybenzyl compound, a triazine compound, benzyl phosphonate, an acylamino phenol, mono- or poly-alcohol, an ester of mono- or poly-alcohols and β-(3,5-di-tert-butyl-4-hydroxyphenyl)-propionic acid, an ester of mono- or poly-alcohols and β-(5-tert-butyl-4-hydroxy-3-methylphenyl)-propionic acid, an ester of mono- or poly-alcohols and β-(3,5-dicyclohexyl-4-hydroxyphenyl)-propionic acid, an ester of mono- or poly-alcohols and 3,5-di-tert-butyl-4-hydroxyphenyl acetic acid, an amide of β-(3,5-di-tert-butyl-4-hydroxyphenyl)-propionic acid, ascorbic acid, and an amine antioxidant.

9. The polarizer of claim 7, wherein the second antioxidant is at least one selected from the group consisting of ANOX® 70 (CAS 41484-35-9), ANOX® 330 (CAS 1709-70-2), ANOX® 1315 (CAS 171090-93-0), ANOX® PP18 (CAS 2082-79-3), LOWINOX® 1790 (CAS 40601-76-1), LOWINOX® 22M46 (CAS 119-47-1), LOWINOX® 44B25 (CAS 85-60-9), LOWINOX® CA22 (CAS 1843-03-4), LOWINOX® CPL (CAS 68610-51-5), LOWINOX® GP45 (CAS 36443-68-2), LOWINOX® HD98 (CAS 23128-74-7), LOWINOX® TBP6 (CAS 90-66-4), and LOWINOX® WSP (CAS 77-62-3), NAUGARD® 536 (CAS 7786-17-6).

10. The polarizer of claim 5, wherein refractive index of the first liquid crystals is smaller than refractive index of the second liquid crystals.

11. The polarizer of claim 1, wherein the polarizing layer is a lyotropic-type comprising discotic liquid crystals.

12. The polarizer of claim 1, further comprising an interlayer disposed between the phase delay layer and the second alignment layer.

13. A display device comprising:
a display panel; and
a polarizer disposed on the display panel,
wherein the polarizer comprises:
   a base film;
   a first alignment layer disposed on the base film;
   a phase delay layer disposed on the first alignment layer;
   a second alignment layer disposed on the phase delay layer; and
   a polarizing layer disposed on the second alignment layer, and
wherein the phase delay layer comprises liquid crystals, an antioxidant, and a derivative of the antioxidant.

14. The display device of claim 13, further comprising a touch sensing layer disposed between the display panel and the polarizer and configured to sense a touch event of a user.

* * * * *